United States Patent
Riley et al.

(10) Patent No.: US 6,862,724 B1
(45) Date of Patent: Mar. 1, 2005

(54) RECONFIGURABLE PROGRAMMABLE LOGIC SYSTEM WITH PERIPHERAL IDENTIFICATION DATA

(75) Inventors: Paul Riley, Burnham (GB); Clive Davies, Cumnor (GB); Iain Scott, Witney (GB); Chris Dettmar, Headington (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 128 days.

(21) Appl. No.: 10/260,111

(22) Filed: Sep. 25, 2002

(51) Int. Cl.[7] .............................................. G06F 17/50
(52) U.S. Cl. ...................................... 716/17; 716/1.12
(58) Field of Search ........................... 719/327; 716/1, 716/12, 16–18; 710/14

(56) References Cited

U.S. PATENT DOCUMENTS

| | | | | |
|---|---|---|---|---|
| 5,150,465 A | * | 9/1992 | Bush et al. | .................... 710/14 |
| 6,651,225 B1 | * | 11/2003 | Lin et al. | ........................ 716/4 |
| 2002/0029303 A1 | * | 3/2002 | Nguyen | ....................... 709/327 |

OTHER PUBLICATIONS

Kozierok, C., "Requirements for Plug and Play," *The PC Guide*, http://www.pcguide.com/ref/mbsys/res/pnprequirements–c.html, Apr. 17, 2001, visited Sep. 27, 2002.
Kozierok, C., "Plug and Play Operation," *The PC Guide*, http://www.pcguide.com/ref/mbsys/res/pnpoperation–c.html, Apr. 17, 2001, visited Sep. 27, 2002.
Kozierok, C., "Extended System Configuration Data (ESCD)," *The PC Guide*, http://www.pcguide.com/ref/mbsys/pnpescd–c.html, Apr. 17, 2001, visited Sep. 27, 2002.
Kozierok, C., "Plug and Play and Non–Plug-and–Play Devices," *The PC Guide*, http://www.pcguide.com/ref/mbsys/res/pnpnon–c.html, Apr. 17, 2001, visited Sep. 27, 2002.
Kozierok, C., "'Play and Pray':^)," *The PC Guide*, http://www.pcguide.com/ref/mbsys/res/pnppray–c.html, Apr. 17, 2001, visited Sep. 27, 2002.
Kozierok, C., "BIOS Settings—PCI/PnP Configuration," *The PC Guide*, http://www.pcguide.com/ref/mbsys/bios/set/pci–c.html, Apr. 17, 2001, visited Sep. 27, 2002.
Kozierok, C., "Plug and Play Aware OS," *The PC Guide*, http://www.pcguide.com/ref/mbsys/bios/set/pciaware–c.html, Apr. 17, 2001, visited Sep. 27, 2002.
Kozierok, C., "PCI IDE Bus Master," *The PC Guide*, http://www.pcguide.com/ref/mbsys/bios/set/pcipci-ide–c.html, Apr. 17, 2001, visited Sep. 27, 2002.

(List continued on next page.)

*Primary Examiner*—Thuan Do
(74) *Attorney, Agent, or Firm*—Fish & Neave IP Group of Ropes & Gray LLP; Jeffrey H. Ingerman (57) ABSTRACT

A reconfigurable programmable logic system including a programmable logic device and an associated processor is configured using a configuration file including (a) instructions for configuring the programmable logic device as one or more peripherals to be used by the processor, and (b) a list of the peripherals to be configured in the programmable logic. The processor uses the peripheral data from the configuration file to load the appropriate drivers, create all necessary instances of the drivers and optionally to pass parameters for any necessary initial command after each driver is loaded. Optionally, each time the system is configured, any previously loaded drivers are first unloaded.

36 Claims, 7 Drawing Sheets

OTHER PUBLICATIONS

Kozierok, C., "Automatic Resource Allocation," *The PC Guide*, http://www.pcguide.com/ref/mbsys/bios/set/pciauto–c.html, Apr. 17, 2001, visited Sep. 27, 2002.

Kozierok, C., "PCI IRQ and DMA Settings/IRQ<n> Assigned to/DMA <n> Assigned To," *The PC Guide*, http://www.pcguide.com/ref/mbsys/bios/set/pcisettings–c.html, Apr. 17, 2001, visited Sep. 27, 2002.

Kozierok, C., "1st/2nd/3rd/4th Available PCI Interrupt," *The PC Guide*, http://www.pcguide.com/ref/mbsys/bios/set/pci-interrupts–c.html, Apr. 17, 2001, visited Sep. 27, 2002.

Kozierok, C., "PCI VGA Palette Snoop," *The PC Guide*, http://www.pcguide.com/ref/mbsys/bios/set/pcisnoop–c.html, Apr. 17, 2001, visited Sep. 27, 2002.

Microsoft Corporation, "PC Card Standard and Windows 95: A Developer's Update," http://msdn.microsoft.com/library/en–us/dndevice/html/msdn_pcccardwp.asp?frame=true, May 1996, visited Sep. 27, 2002.

Kozierok, C., "Peripheral Component Interconnect (PCI) Local Bus," The PC Guide, http://www.pcguide.com/ref/mbsys/buses/types/pci–c.html, Apr. 17, 2001, visited Sep. 27, 2002.

Kozierok, C., "PCI Bus Performance," The PC Guide, http://www.pcguide.com/ref/mbsys/buses/types/pciperformance–c.html, Apr. 17, 2001, visited Sep. 27, 2002.

Kozierok, C., "PCI Expansion Slots," *The PC Guide*, http://www.pcguide.com/ref/mbsys/buses/types/pcislots–c.html, Apr. 17, 2001, visited Sep. 27, 2002.

Kozierok, C., "PCI Internal Interrupts," *The PC Guide*, http://www.pcguide.com/ref/mbsys/buses/types/pciinterrupts–c.html, Apr. 17, 2001, visited Sep. 27, 2002.

Kozierok, C., "PCI Bus Mastering," *The PC Guide*, http://www.pcguide.com/ref/mbsys/buses/types/pcimastering–c.html, Apr. 17, 2001, visited Sep. 27, 2002.

Kozierok, C., "PCI IDE Bus Mastering," *The PC Guide*, http://www.pcguide.com/ref/mbsys/buses/types/pciidebm–c.html, Apr. 17, 2001, visited Sep. 27, 2002.

Kozierok, C., "PCI Plug and Play," *The PC Guide*, http://www.pcguide.com/ref/mbsys/buses/types/pcipnp–c.html, Apr. 17, 2001, visited Sep. 27, 2002.

Kozierok, C., "Plug and Play," *The PC Guide*, http://www.pcguide.com/ref/mbsys/res/pnp–c.html, Apr. 17, 2001, visited Sep. 27, 2002.

* cited by examiner

| FILE FORMAT | | |
| --- | --- | --- |
| OFFSET | SIZE | DATA |
| 0H | 4 | SIGNATURE "SBI\0" |
| 4H | 4 | IDCODE FOR TARGET SYSTEM |
| 8H | 4 | OFFSET TO CONFIGURATION DATA (coffset) |
| CH | 4 | SIZE OF CONFIGURATION DATA IN BYTES (csize). MUST BE A MULTIPLE OF 4 |
| 10H | 4 | OFFSET TO HARDWARE LIST DATA (hoffset) |
| 14H | 4 | SIZE OF HARDWARE LIST DATA (hsize) |
| | | MORE INFORMATION WILL BE ADDED HERE |
| coffset | csize | PLD CONFIGURATION DATA. THIS IS A BYTE STREAM TO BE WRITTEN TO THE PLD SLAVE PORT |
| hoffset | hsize | HARDWARE LIST DATA. THIS IS FORMATTED AS DESCRIBED BELOW |

FIG. 4

| HARDWARE LIST BLOCK FORMAT ||| |
|---|---|---|---|
| OFFSET | SIZE | DATA | |
| 0H | 4 | SIZE OF BLOCK (INCLUDING THIS FIELD). 0 INDICATES THAT THIS IS THE TERMINATION BLOCK | 51 |
| 4H | 2 | VENDOR ID FOR PERIPHERAL | 52 |
| 6H | 2 | PRODUCT ID FOR PERIPHERAL | 53 |
| 8H | 1 | SIZE OF FIXED PART OF BLOCK (fsize) | 54 |
| 9H | 1 | LENGTH OF PERIPHERAL NAME (nsize) | 55 |
| AH | 2 | SIZE OF PERIPHERAL SPECIFIC REGION (pssize) | 56 |
| CH | 2 | SIZE OF CONFIGURATION COMMAND (cmdsize) | 57 |
| EH | 1 | INTERRUPT NUMBER | 58 |
| FH | 1 | VERSION NUMBER | 59 |
| 10H | 4 | REGISTER BASE ADDRESS | 500 |
| 14H | 4 | REGISTER SIZE (0 IF NO REGISTERS) | 501 |
| | | NEW FIXED SIZE DATA WILL BE ADDED HERE | 502 |
| fsize | nsize | USER NAME FOR THIS PERIPHERAL (0 TERMINATED) | 503 |
| FOLLOWS | pssize | PERIPHERAL SPECIFIC DATA | 504 |
| FOLLOWS | cmdsize | VALUE TO PASS TO CONFIGURATION COMMAND TO BE EXECUTED AFTER DEVICE IS LOADED | 505 |
| FOLLOWS | | NEW VARIABLE SIZE DATA WILL BE ADDED HERE | 506 |

RECONFIGURABLE PROGRAMMABLE LOGIC SYSTEM WITH PERIPHERAL IDENTIFICATION DATA

BACKGROUND OF THE INVENTION

This invention relates to a reconfigurable programmable logic system including a programmable logic device and an associated processor, in which a configuration file includes identifications of peripheral devices in the current configuration.

Early programmable logic devices were onetime configurable. For example, configuration may have been achieved by "blowing"—i.e., opening—fusible links. Alternatively, the configuration may have been stored in a programmable read-only memory. Later, programmable logic devices incorporating erasable programmable read-only memory (EPROM) for configuration became available. These devices could be reconfigured.

Still later, programmable logic devices incorporating static random access memory (SRAM) for configuration became available. These devices, which also can be reconfigured, store their configuration in a nonvolatile memory such as an EPROM, from which the configuration is loaded when the device is powered up. Such devices typically include the circuitry necessary to load the configuration from the nonvolatile storage.

More recently, programmable logic devices have been provided as part of systems that can include, separately or on the same chip, processors, memory, busses, UARTs, timers, various types of controllers, etc. In such programmable systems, the programmable logic device can be used to provide specialized user-designed logic functions, or it can be configured as one or more peripheral devices, such as modems, network interfaces, ports of various types, etc. If the programmable logic device is large enough, it can be configured to have a plurality of functions including both peripheral devices and user logic.

For each peripheral device configured in the programmable logic, the processor of the system may need driver software. Known methods for programming programmable logic devices have heretofore not included mechanisms for identifying such drivers as may be needed, or the number of instances of each driver that may be needed. Moreover, the programmable logic in such systems typically is reconfigurable, meaning that a system of the type described can change, so that it no longer needs certain drivers that had been loaded, while at the same time it needs certain new drivers.

It would be desirable in a reconfigurable programmable logic system to be able to provide a method for identifying and loading the necessary drivers, and creating and configuring the necessary instances of each driver, on reconfiguration of the system, and also, on a second or subsequent configuration, to avoid conflicts with drivers that are no longer needed.

SUMMARY OF THE INVENTION

It is an advantage of the present invention to be able to provide, in connection with a reconfigurable programmable logic system, a method for identifying and loading the necessary drivers, and creating and configuring the necessary instances of each driver, on reconfiguration of the system, and also, on a second or subsequent configuration, to avoid conflicts with drivers that are no longer needed.

This and other advantages of the invention are achieved in accordance with the principles of the invention by providing a programmable logic system including a processor, a reconfigurable programmable logic device adapted to be configured according to a configuration file into at least one peripheral device for the processor, and memory for storing driver software for at least one of the at least one peripheral device. The configuration file includes the identifications of the at least one peripheral device. The processor, on configuring of the programmable logic device, reads the identifications of the at least one peripheral device from the configuration file, and loads the appropriate driver software into the memory.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which.

DETAILED DESCRIPTION OF THE INVENTION

The present invention is useful in any configurable programmable logic system, but is particularly adapted for use in a reconfigurable programmable logic system, where the configuration data cannot be fixed in advance, and particularly in a system in which a programmable logic device may be configured (and reconfigured) as one or more peripheral devices for a processor. The processor may be completely separate from the programmable logic device, or may be on the same integrated circuit chip as the programmable logic device. In the latter case, the processor could be a hard processor separate from the programmable logic device but formed on the same chip, or could be a soft processor that is located on a separate programmable logic device, on a non-reconfigurable portion of the programmable logic device, or on one reconfigurable portion of a programmable logic device having more than one separately reconfigurable portion.

As is known in connection with programmable logic devices, configuring of the programmable logic device into its user-designed configuration preferably is carried out in accordance with the contents of a configuration file under the control of a suitable programming device. Preferably, in a system according to the present invention the programming device is the processor of the programmable logic system that includes the programmable logic device. Thus, that processor, whether separate from the integrated circuit device on which the programmable logic device is fabricated, or fabricated on the same integrated circuit device, preferably reads the configuration instructions and configures the programmable logic device.

In accordance with the invention, the configuration file also includes data regarding the peripheral devices included in the configuration. The data include a section describing the peripherals, as described in more detail below. The actual peripheral data may be located before or after the configuration data, but in any event their location and size preferably are specified in a header. Ideally the data should be arranged so that they can be read sequentially, but that is not required.

The actual peripheral data include identification of any peripheral devices included in the configuration, and could include the driver software for the peripherals or an identification of the driver software, or the processor could simply identify the driver software based on the identification of the peripheral. When the processor reads the configuration file to configure the programmable logic device, it also reads the data regarding the peripherals. From those data, the processor can set its own configuration.

In addition, if the data include the peripheral driver software, the processor can load that software, although this option would greatly increase the size of the configuration file. If the data include merely an identification of the driver software, the processor can search for the driver software in a memory containing a library of driver software. Similarly, the processor may simply use the identification of the peripherals to look up the identification of the appropriate driver software in a table stored in a suitable memory, and based on that identification can search for the driver software in a memory containing a library of driver software. The processor can, if desired, perform the loading of the driver software simultaneously with, or ahead of, the configuration of the programmable logic device, bearing in mind, however, that part of the driver installation and initialization may include registration of certain configuration functions with the operating system. After both configuration and driver installation are complete, the system then preferably initializes each peripheral by calling the initialization function, if any, of its respective driver.

For each driver to be loaded, it may be that more than one instance of each driver must be configured. For example, a configuration may include a plurality of, e.g., UARTs, each of which requires its own instance of the UART driver. Each UART entry in the configuration file would call for its own instance of the UART driver. In addition, a driver may be parameterizable, and the configuration file may pass parameters to the driver to configure a particular instance. Thus, in the UART example, the UART driver may be provided for UARTs having FIFO buffers of any length. The configuration file preferably passes to the UART driver a parameter indicating the length of the FIFO buffer. Where more than one instance of a UART is to be configured, the configuration file entry for each instance can specify its own respective FIFO length, so that different instances of the UART can have different FIFO lengths.

It is possible that the processor that performs the configuration of the programmable logic device may not be the processor of the programmable logic system. This is particularly a possibility where the processor of the programmable logic system is fabricated on a device separate from the programmable logic device. In such a case, the programmable logic system, including the system processor, could first be assembled, and the configuration would proceed as above under control of the system processor. However, it is also possible that a separate processor could be used to configure the programmable logic device before the programmable logic system is assembled. In that case, the separate processor preferably would write the peripheral data to a location (e.g., a suitable buffer or memory) that could be accessed by the system processor after the system is assembled. The system would then load the appropriate driver software. Alternatively, the configuration file could remain accessible to the system processor even after configuration is complete, allowing the system processor to read the configuration file for the purpose of accessing the peripheral data. The configuration file is handled similarly when the processor is a soft processor. In such a case, an external processor is required to configure the programmable logic device to create not only the peripherals but also the programmable logic system's soft processor. Alternatively, the external processor could create the soft processor which could then take over configuration of the peripherals. Either way, once the soft processor has been created, it needs access to the peripheral data. Preferably, the soft processor accesses the peripheral data which is stored in a designated buffer or memory by the external processor, or which remains in the configuration file to which the soft processor is given access.

As a further option, the configuration file could include parameters for respective instances of commands associated with each of one or more of the peripheral drivers, where those drivers are of a type that runs a command on being loaded. The processor may run any such commands after a respective driver is loaded and as each instance of that driver is created and configured, or after a respective driver is loaded and after all instances of that driver have been created and configured, or after all of the drivers are loaded and all instances are created and configured, applying the parameter(s) from the configuration file to each respective instance of each respective command. Alternatively, and more preferably, the configuration file could include an identifier that indicates additional configuration steps to be performed by the operating system after initialization of a peripheral. For example, in the case of a network interface peripheral, the identifier may indicate that the IP address and routing table should be configured after the peripheral has been initialized. In a simpler variant of this alternative, the configuration file passes parameters to be used by the driver software in the execution of a required post-initialization configuration command built into the driver.

Programmable logic devices of the type included in the programmable logic system generally can be reconfigured at any time. One result of such a reconfiguration could be that the set of peripheral devices in the system changes. In order for the system to operate properly the set of loaded drivers must change accordingly. The loading of new drivers for new peripherals is carried out, as described above, as part of the reconfiguration of the programmable logic device that creates the new peripherals. However, to the extent that in a reconfiguration there may be drivers that the processor loaded for the previous configuration, those drivers might occupy memory that may be required for other functions or for the newly-loaded drivers, and might even conflict with one or more of the newly-loaded drivers. In addition, the devices for which the drivers were provided may no longer exist in the new configuration, which can cause errors if the driver attempts, e.g., to communicate with a register at a particular address and that register no longer exists. Therefore, regardless of whether or not the processor and the programmable logic device are part of the same integrated circuit chip, and regardless of whether or not the processor is a soft processor, the processor, in accordance with the invention, on any configuring of the programmable logic device, checks for drivers previously loaded and, if it finds any, removes any instances of such drivers, preferably before any of the new drivers are loaded or new driver instances are created. If necessary, an appropriate command or commands may be executed in connection with the removal of an instance of a driver. For example, if an instance of an Ethernet driver is removed, the corresponding network stack can be taken down.

Processors in programmable logic systems according to the invention may run any one of a number of different operating systems including UNIX, Linux or a version of the vxWorks® operating system available from Wind River systems, Inc., of Alameda, Calif. In accordance with the invention, suitable adjustments may be made in the operating system of the processor in order for it to be able to carry out the invention. Specifically, the operating system must be configured to read the peripheral data at the appropriate time and act upon it appropriately as described above. For example, kernel modifications may be required to track which drivers that are enabled to use this invention are currently loaded, and to allow those drivers to register functions, which can be called with suitable parameters as peripherals of the type driven by the driver are added to and removed from the system.

The invention will now be described with reference to FIGS. 1–6.

Figure 1:
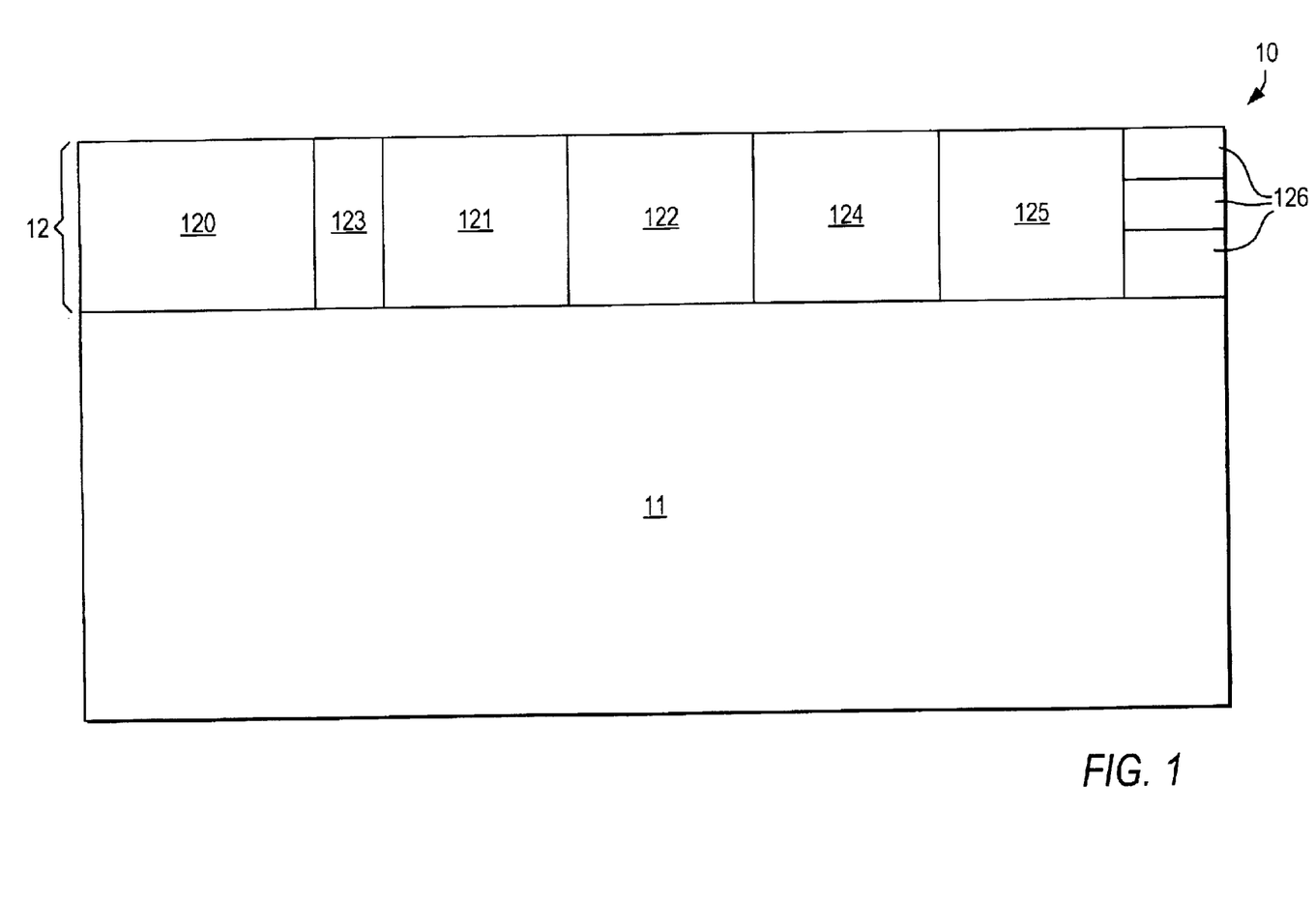
FIG. 1 is a schematic diagram of a first embodiment of a programmable logic system in which the present invention can be embodied.

FIG. 1 shows a first preferred embodiment 10 of a programmable logic system of the type in which the present invention may be embodied. Programmable logic system 10 is similar to hard-processor members of the EXCALIBUR™ family of embedded processor devices available from Altera Corporation, of San Jose, Calif., the assignee hereof. Programmable logic system 10 preferably includes a region of programmable logic 11, which may be similar to one or more SRAM-type programmable logic devices such as those belonging to assignee's APEX™ family of programmable logic devices.

By way of example, such a programmable logic system 10 also includes a "stripe" 12 of additional circuitry including an embedded processor 120, which may belong to the ARM® family of processors available from ARM Ltd., of Cambridge, England. Other components in stripe 12 may include memory, including both single-port RAM 121 and dual-port RAM 122, as well as cache memory 123, external bus interface 124, a UART 125 for serial communications, and various counters/timers 126.

As stated above, programmable logic 11 could be configured as one or more peripheral devices for use by processor 120. Programmable logic 11 could be configured by an external programming device (not shown in FIG. 1) or, more preferably in this embodiment, by processor 120 itself. The instructions for configuration of programmable logic 11 are supplied to processor 120 (or the external programming device) in the form of a configuration file, which may be stored in RAM 121 or 122 or communicated to processor 120 directly from outside system 10 via, e.g., external bus interface 124 or UART 125. In the event an external programming device is used, it preferably reads the configuration file from an external memory provided for that purpose, which may be one of random-access memories 121, 122. As discussed above, in accordance with the present invention the configuration file includes not only instructions for configuring programmable logic 11, but also data identifying the peripheral devices into which programmable logic 11 is to be configured. The identifying data may include any driver software necessary for such peripheral devices or the identifications of such software, or the processor may be able to identify the necessary drivers from the identifications of the peripherals and then load the drivers from a separate memory in which they are stored. Optionally, the configuration file may also include values or parameters to be passed to any commands to be run, or additional configuration steps to be carried out, once the respective drivers have been loaded, as described above.

The peripheral data can be provided in any predetermined location in the configuration file. After being read, the peripheral data preferably are stored by processor 120 (e.g., in RAM 121 or 122) to be acted upon before, during or after configuring of programmable logic 11, as described above.

Figure 2:
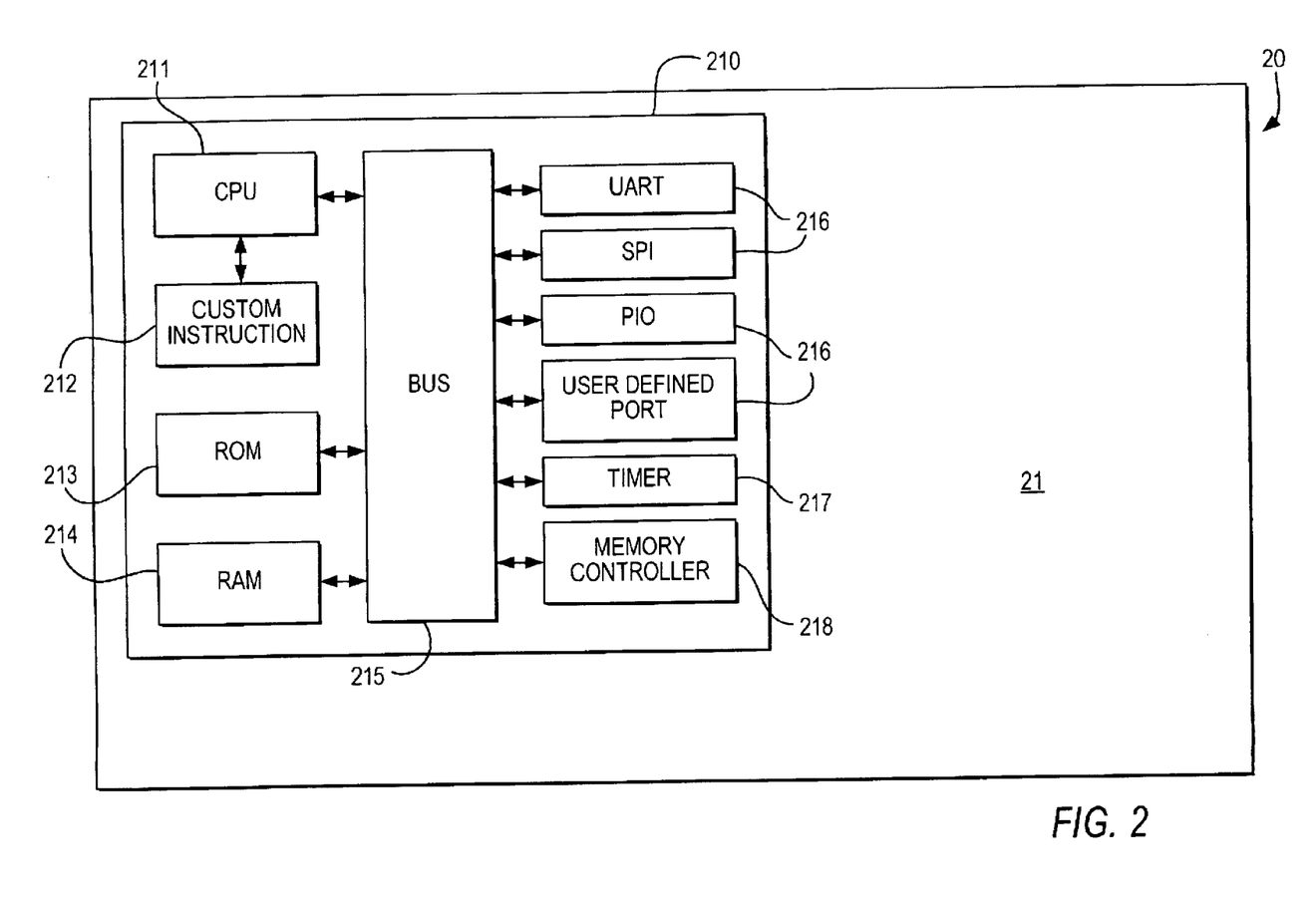
FIG. 2 is a schematic diagram of a second embodiment of a programmable logic system in which the present invention can be embodied.

FIG. 2 shows a second preferred embodiment 20 of a programmable logic system of the type in which the present invention may be embodied. Programmable logic system 20 is similar to soft-processor members of the EXCALIBUR™ family of embedded processor devices available from Altera Corporation. Programmable logic system 20 preferably includes a region of programmable logic 21, which may be similar to one or more SRAM-type programmable logic devices such as those belonging to Altera Corporation's APEX™ family of programmable logic devices.

By way of example, in such a programmable logic system 20, programmable logic 21 preferably is configured, in part, as a soft processor 210, such as a member of the Nios™ family of soft processor available from Altera Corporation. In addition to a CPU 211, such a soft processor may also include custom instruction memory 212, on-board ROM 213 and RAM 214, a bus 215, various input/output modules 216, timer 217 and memory controller 218. Programmable logic system 20 preferably also includes other user-defined logic in programmable logic 21, at least some of which is configured as one or more peripheral devices for CPU 211. As in the case of programmable logic system 10, the configuration file for programmable logic 21 preferably includes data regarding the peripherals into which programmable logic 21 is to be configured, including the respective software drivers for those peripherals or data sufficient to identify those drivers. Again, any appropriate values or parameters for initial commands may also be included.

In this embodiment, however, the configuring of programmable logic 21 preferably is carried out by an external programming device. Alternatively, the external programming device could configure soft processor 211, which could then take over the configuring of the remainder of programmable logic 21. In either case, the configuration file might be accessed twice—once by the external programming device to configure soft processor 211 and in the first case to also configure the remainder of programmable logic 21, and a second time by soft processor 211 to read the peripheral data so that it can load the appropriate drivers, etc. (and possibly also to configure the remainder of programmable logic 21). It is also possible for the configuration file to be accessed only once—by the external programming device, which could then store in a predetermined location (e.g., in one of memories 213, 214) any data from the configuration file that would be needed by soft processor 211.

Figure 3:
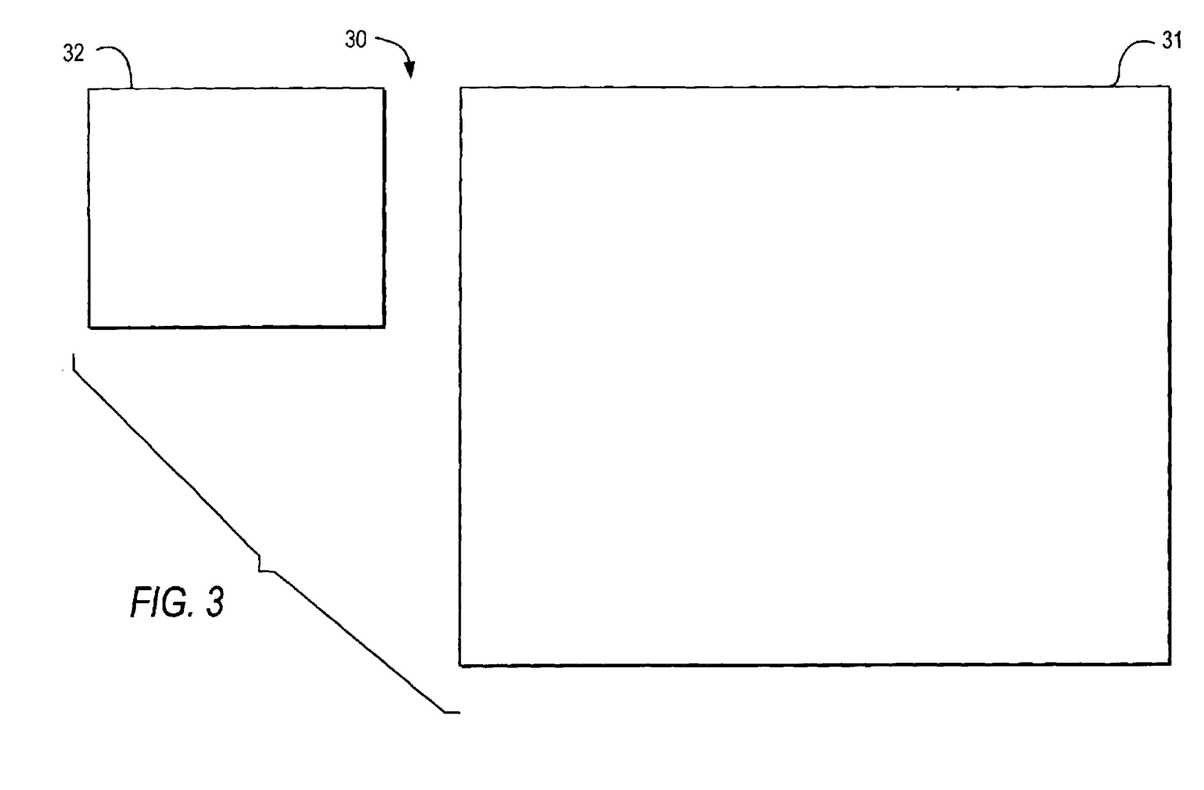
FIG. 3 is a schematic diagram of a third embodiment of a programmable logic system in which the present invention can be embodied.

FIG. 3 shows a third preferred embodiment 30 of a programmable logic system in accordance with the present invention. Programmable logic system 30 preferably includes a programmable logic device 31, such as a member of Altera Corporation's APEX™ family of programmable logic devices, combined with an external processor 32, which can be any suitable microprocessor. Programmable logic system 30 preferably also includes various interfaces, memories and other modules (not shown), while programmable logic device 31 is configured as, inter alia, various peripheral devices for processor 32.

In this third preferred embodiment, programmable logic device 31 preferably is configured by processor 32. Here also the configuration file preferably is stored in an external location, to be read by processor 32 so that appropriate drivers can be loaded for the peripherals into which programmable logic device 31 is to be configured. As above, programmable logic device 31 could also be configured by an external programming device separate from processor 32, but even in such a case, processor 32 would need the peripheral data from the configuration file to load the appropriate drivers, etc. Processor 32 could read the configuration file separately from the reading of the configuration file by the external programming device, or the external programming device could extract the peripheral data during its reading of the configuration file, and store the peripheral data in a predetermined location for access by processor 32.

Figure 4:
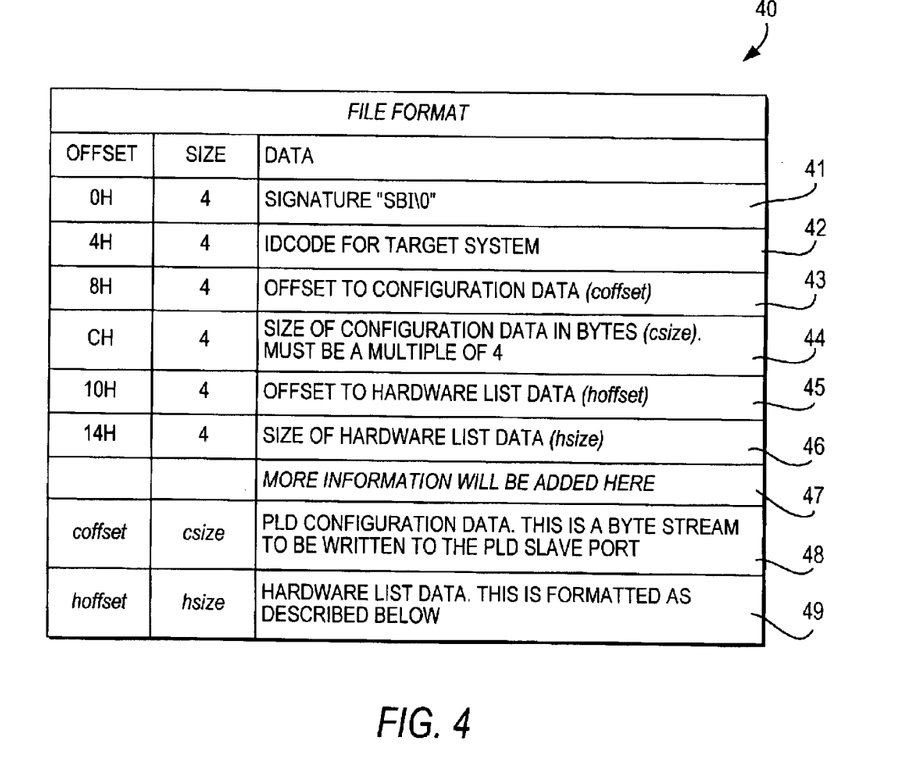
FIG. 4 is a tabular representation of a preferred arrangement of the contents of a programmable logic device image file in accordance with the present invention.

A preferred format 40 for the configuration file is shown in FIG. 4. Block 41 preferably-is a signature block of four bytes. Block 42 preferably contains a four-byte identification code for the type of programmable logic system to which file 40 is targeted. Block 43 preferably contains four bytes representing the location, or offset (coffset), of the beginning of the configuration data, while block 44 preferably contains four bytes representing the size (csize) of the configuration data, which in the preferred embodiment is a multiple of four. Block 45 preferably contains four bytes representing the offset (hoffset) of the peripheral hardware data in accordance with the invention. Block 46 preferably contains data representing the size (hsize) of the peripheral hardware data. Optional block 47 may contain further data as may be required in a particular implementation.

Figure 5:
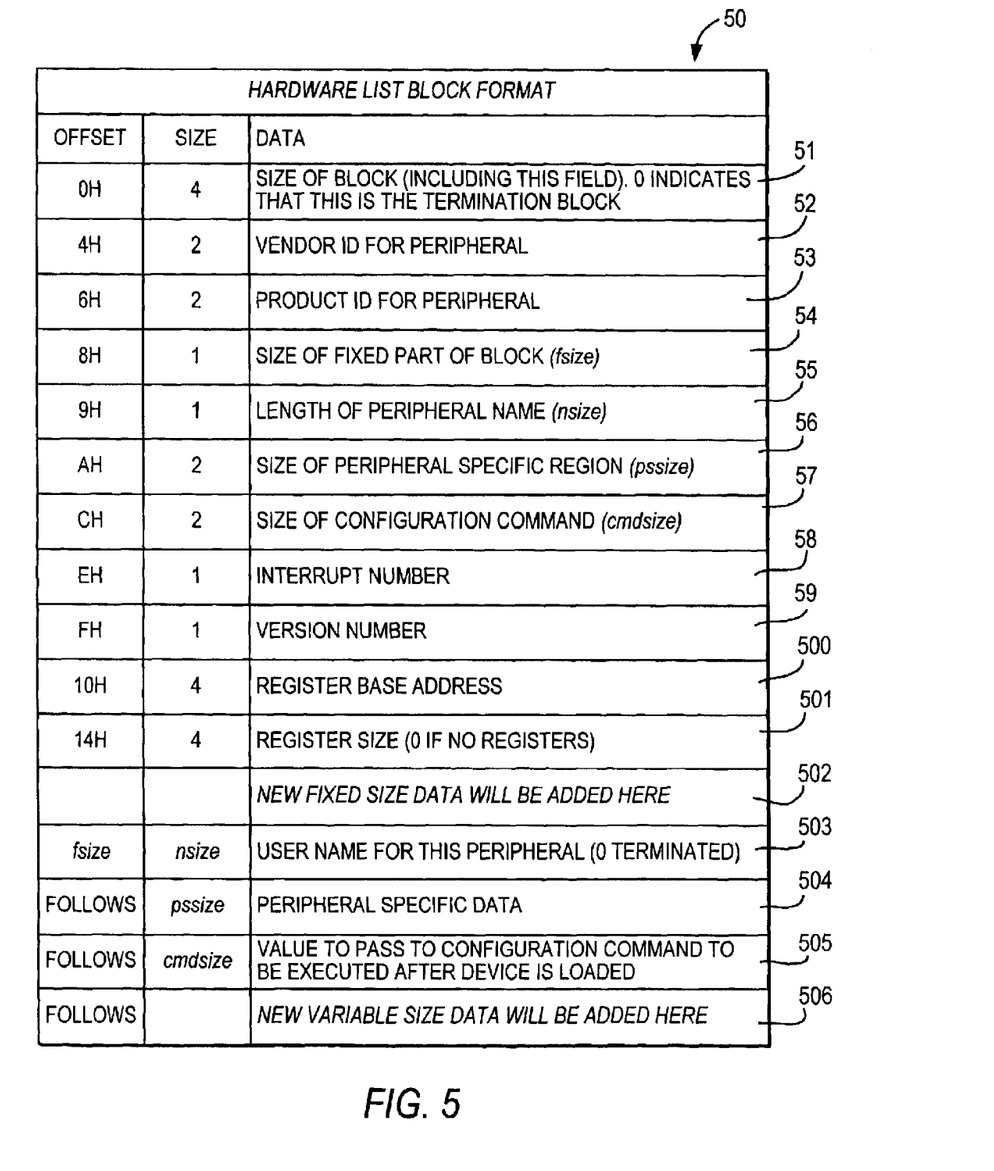
FIG. 5 is a tabular representation of a preferred arrangement of a portion of the programmable logic device image file represented in FIG. 5.

Block 48, located at offset coffset, preferably contains the ordinary programmable logic device configuration data of size csize, which is used to configure the programmable logic device as, inter alia, the peripherals used by the processor of a system 20, 30, 40 according to the invention. Block 49, located at offset hoffset, preferably contains the peripheral data, of size hsize, according to the invention, which includes a plurality of subblocks as described in connection with FIG. S.

It should be noted that the fields of file 40 preferably are of a fixed endianness, and more preferably little endian. If all offsets in file 40 point forward, then the file can be read sequentially. Sequential reading is not required, but may be preferable in some cases.

FIG. 5 shows the format of one subblock 50 of block 49. If block 49 exists at all, it will contain at least two subblocks 50, of which the last is a terminator block.

The first field 51 in any subblock 50 contains four bytes indicating the size of that subblock. If the data in field 51 equal zero, that signifies that the particular subblock 50 is a terminator block. If subblock 50 is not a terminator block, then field 52 includes two bytes representing a vendor identification of the peripheral represented by the particular subblock 50, and field 53 includes two bytes representing the particular product identification of the peripheral.

Field 54 includes one byte representing the size (fsize) of the fixed portion of subblock 50—i.e., the portion that contains the fields present in all subblocks 50, but not the fields in the portion of subblock 50 that are peculiar to the particular peripheral being represented, which may differ. Field 55 contains two bytes representing the length (nsize) of the name of peripheral being represented. Field 56 contains two bytes representing the length (pssize) of the peripheral-specific region of subblock 50. Field 57 contains two bytes representing the length (cmdsize) of any configuration command parameter(s) that may be included in subblock 50 for execution after loading of the respective driver for the peripheral being represented.

Each of fields 58, 59 contains one byte representing, respectively, an interrupt number and version number for the peripheral being represented. Each of fields 500, 501 contains four bytes representing, respectively, the register base address and the register size (which is zero if there are no registers in the peripheral) of the peripheral being represented. Block 502 optionally contains additional fixed-size data regarding the peripheral being represented, as may be required in a particular implementation.

At offset fsize (see field 54), field 503, of size nsize (see field 55), contains the name of the peripheral being represented. Following field 503, field 504 contains peripheral-specific data of size pssize (see field 56), followed in field 505 by one or more configuration commands (if any) of size cmdsize (see field 57). Other variable size data may be included in field 506 (and others, if needed), as may be required in a particular implementation.

If fields 52 and 53 both contain zeroes, then subblock 50 is a global hardware settings block, the data in which indicate the mode of the fixed part of the system (out of plural possible operating modes, when provided) in which the system processor needs to be to run the configuration.

Any suitable utility can be used to combine the standard configuration data with the peripheral data to create file 40 as depicted in FIGS. 4 and 5.

Figure 6:
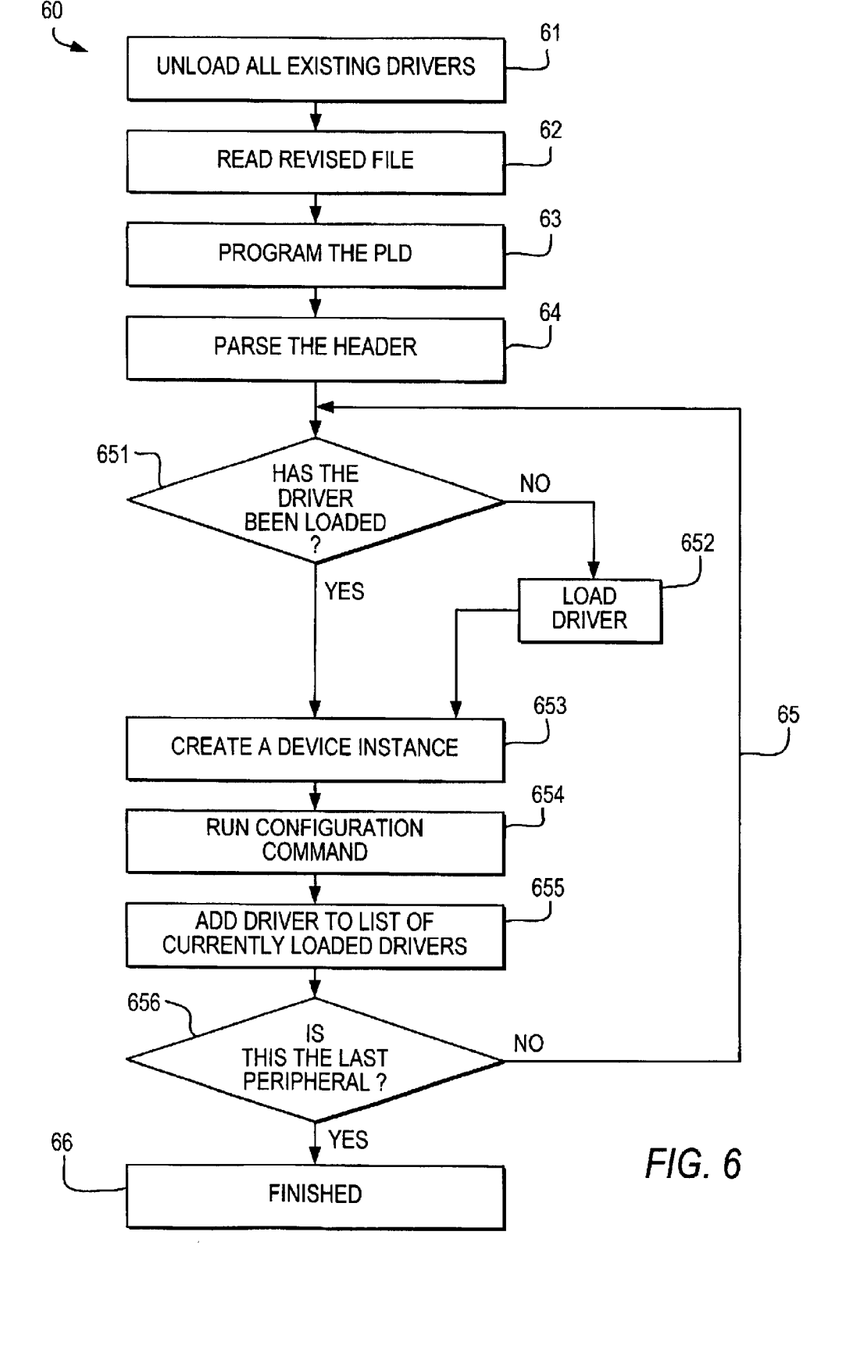
FIG. 6 is a flow diagram of a preferred embodiment of a method in accordance with the-present invention.

A preferred embodiment 60 of a method of operating the present invention is diagramed in FIG. 6. At step 61, any previously loaded drivers are unloaded. This step can be included even the first time the system is configured, because if there are no drivers to unload, the system will simply proceed to step 62. At step 62, file 40 is read, and is used to configure the programmable logic device at step 63.

Next, at step 64, the header data and the data representing the peripheral device(s) included in the programmable logic device configuration are read. For each subblock 50, loop 65 is executed. In test 651, the system checks whether or not the driver corresponding to the peripheral in question (fields 52, 53, or field 503) has already been loaded. If not, then at step 652 the driver is loaded from either the configuration file itself, if it is included there, or from a repository of drivers included in a suitable memory in system 20, 30, 40. An instance of the driver is then created at step 653. If at test 651 the driver has been loaded previously, another instance is created at step 653. (One possible use of field 502 and/or field 506 may be to indicate if multiple instances of a driver are needed and, if so, how many.) At step 654, any configuration command that may be necessary is executed, acting on parameters that may be passed via the configuration file (field 505). At step 655, the driver is added to a list of currently loaded drivers, stored in a suitable memory (to be used at step 61 the next time method 60 is run). At test 656 the system tests to see if there are any more peripherals (i.e., does the next field 51 contain something other than zero?). If there are more peripherals (contents of next field 51 are non-zero), loop 65 repeats; otherwise, method 60 ends at 66.

Figure 7:
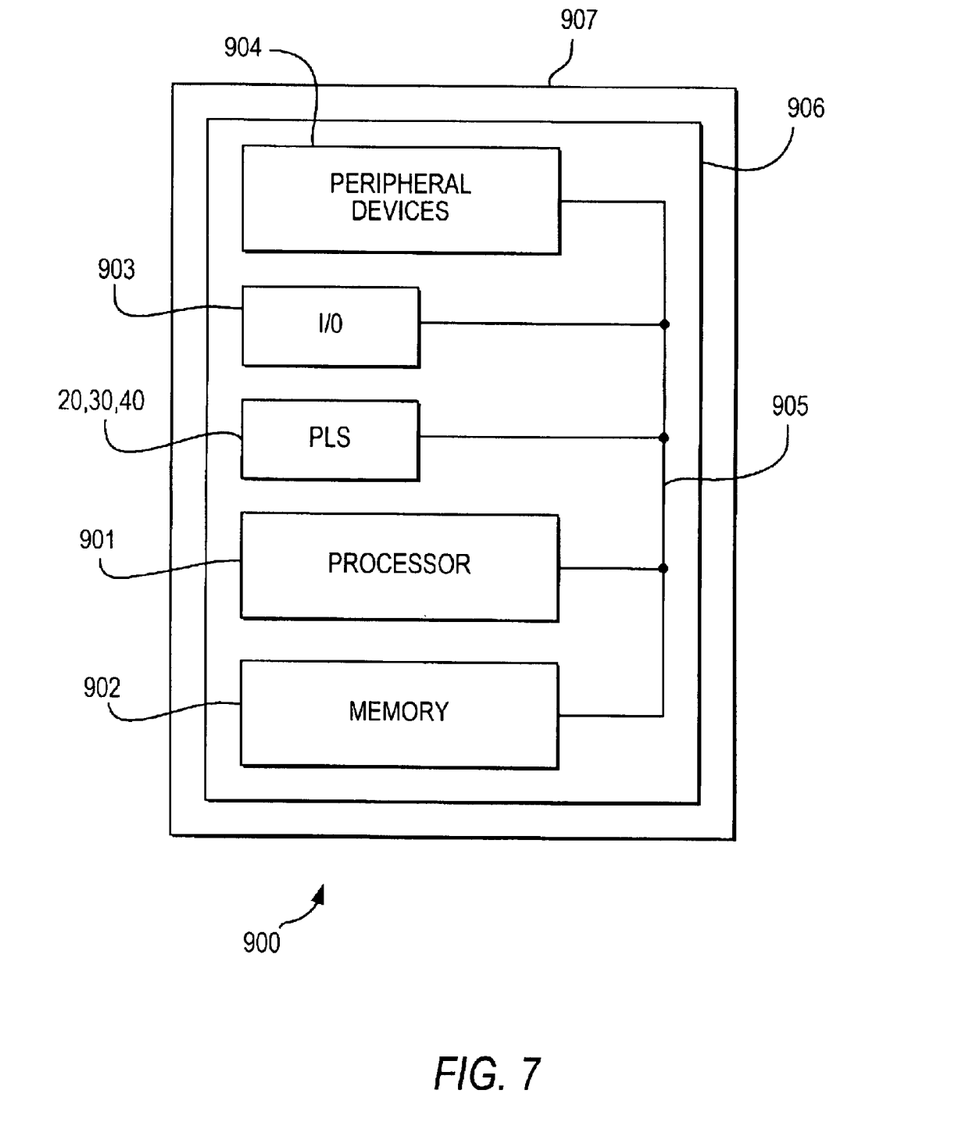
FIG. 7 is a simplified block diagram of an illustrative system employing a programmable logic system in accordance with the invention.

Programmable logic system (PLS) 20, 30, 40 incorporating an update feature as described above may be used as part of a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. Programmable logic system 10 can be used to perform a variety of different logic functions. For example, programmable logic system 10 can be configured as a processor or controller that works in cooperation with processor 901. Programmable logic system 10 may also be used as an arbiter for arbitrating access to a shared resources in system 900. In yet another example, programmable logic system 10 can be configured as an interface between processor 901 and one of the other components in system 900. It should be noted that system 900 is only exemplary, and that the true scope and spirit of the invention should be indicated by the following claims.

Various technologies can be used to implement programmable logic systems 20, 30, 40 as described above according to this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A programmable logic system comprising:
   a processor;
   a reconfigurable programmable logic device adapted to be configured according to a configuration file into at least one peripheral device for said processor; and
   memory for loading thereinto driver software for at least one of said at least one peripheral device; wherein:
   said configuration file further comprises:
   a respective identification of each said at least one peripheral device, and
   parameter data to be passed to at least one command associated with said driver software for at least one of said at least one peripheral device; and
   said processor, on configuring of said programmable logic device:
   reads said respective identification of each said at least one peripheral device from said configuration file,
   loads said driver software for each instance of said at least one peripheral device into said memory, and
   after loading said driver software, passes said parameter data to said driver software.

2. The programmable logic system of claim 1 wherein said processor, on configuring of said programmable logic device, configures at least one additional instance of at least one of said at least one peripheral device.

3. The programmable logic system of claim 1 wherein said configuration file includes said driver software.

4. The programmable logic system of claim 1 further comprising a source device from which said driver software is loaded into said memory.

5. The programmable logic system of claim 4 wherein:
   said configuration file includes data identifying said at least one peripheral device; and
   said processor uses said data identifying said at least one peripheral device to locate said driver software in said source device.

6. The programmable logic system of claim 4 wherein:
   said configuration file includes data identifying said driver software; and
   said processor uses said data identifying said driver software to locate said driver software in said source device.

7. The programmable logic system of claim 1 wherein:
   said programmable logic device is fabricated on an integrated circuit device; and
   said processor is external to said integrated circuit device.

8. The programmable logic system of claim 1 wherein:
   said programmable logic device is fabricated on an integrated circuit device; and
   said processor is internal to said integrated circuit device.

9. The programmable logic system of claim 8 wherein said processor is fabricated on said integrated circuit device.

10. The programmable logic system of claim 8 wherein said processor is a soft processor in said programmable logic device.

11. The programmable logic system of claim 1 wherein said processor, on said configuring, and prior to loading said driver software, removes from said memory one or more instances of driver software previously loaded into said memory.

12. The programmable logic system of claim 11 wherein said processor, on said removing, executes a command associated with said driver software.

13. The programmable logic system of claim 11 wherein:
   said programmable logic device is fabricated on an integrated circuit device; and
   said processor is external to said integrated circuit device.

14. The programmable logic system of claim 11 wherein:
   said programmable logic device is fabricated on an integrated circuit device; and
   said processor is internal to said integrated circuit device.

15. The programmable logic system of claim 14 wherein said processor is fabricated on said integrated circuit device.

16. The programmable logic system of claim 14 wherein said processor is a soft processor in said programmable logic device.

17. The programmable logic system of claim 11 wherein:
   said configuration file comprises respective parameter data to be passed to at least one respective command associated with respective driver software for each of a plurality of said at least one peripheral device; and
   after said processor loads said respective driver software and configures an instance of said driver software for a respective one of said plurality of said at least one peripheral device, said processor passes said respective parameter data to said instance of said driver software for said respective one of said plurality of said at least one peripheral device.

18. The programmable logic system of claim 11 wherein:
   said configuration file comprises respective parameter data to be passed to at least one respective command associated with respective driver software for each of a plurality of said at least one peripheral device; and
   said processor passes said parameter data to said driver software for each respective one of said plurality of said at least one peripheral device after said processor loads said driver software and configures instances of said driver software for all of said plurality of said at least one peripheral device.

19. The programmable logic system of claim 1 wherein:

said configuration file comprises respective parameter data to be passed to at least one respective command associated with respective driver software for each of a plurality of said at least one peripheral device; and after said processor loads said respective driver software and configures an instance of said driver software for a respective one of said plurality of said at least one peripheral device, said processor passes said respective parameter data to said instance of said driver software for said respective one of said plurality of said at least one peripheral device.

20. The programmable logic system of claim 1 wherein:

said configuration file comprises respective parameter data to be passed to at least one respective command associated with respective driver software for each of a plurality of said at least one peripheral device; and said processor passes said parameter data to said driver software for each respective one of said plurality of said at least one peripheral-device after said processor loads said driver software and configures instances of said driver software for all of said plurality of said at least one peripheral device.

21. A digital processing system comprising:

processing circuitry;

a memory coupled to said processing circuitry; and a programmable logic system as defined in claim 1 coupled to the processing circuitry and the memory.

22. A printed circuit board on which is mounted a programmable logic system as defined in claim 1.

23. The printed circuit board defined in claim 22 further comprising:

memory circuitry mounted on the printed circuit board and coupled to the programmable logic system.

24. The printed circuit board defined in claim 23 further comprising:

processing circuitry mounted on the printed circuit board and coupled to the memory circuitry.

25. A method of configuring a programmable logic system comprising a processor and a reconfigurable programmable logic device adapted to be configured according to a configuration file into at least one peripheral device for said processor, said configuration file including a respective identification of each said at least one peripheral device, and further comprising parameter data to be passed to said driver software for at least one of said at least one peripheral device; said method comprising:

on configuring of said programmable logic device:

reading said respective identification of each said at least one peripheral device from said configuration file;

loading driver software for each instance of said at least one peripheral device into a memory; and after loading said driver software, passing said parameter data to said driver software.

26. The method of claim 25 further comprising configuring at least one additional instance of at least one of said at least one peripheral device.

27. The method of claim 25 wherein said configuration file includes said driver software.

28. The method of claim 25 wherein which said driver software is loaded into said memory from a source device.

29. The method of claim 28 wherein:

said configuration file includes data identifying said at least one peripheral device; said method further comprising:

using said data identifying said at least one peripheral device to locate said driver software in said source device.

30. The method of claim 28 wherein:

said configuration file includes data identifying said driver software; said method further comprising:

using said data identifying said driver software to locate said driver software in said source device.

31. The method of claim 25 further comprising, prior to loading said driver software, removing from said memory one or more instances of driver software previously loaded into said memory.

32. The method of claim 31 further comprising, on said unloading, executing a command associated with said driver software.

33. The method of claim 31 wherein:

said configuration file comprises respective parameter data to be passed to respective driver software for each of a plurality of said at least one peripheral device; said method further comprising:

after loading said respective driver software and configuring an instance of said respective driver software for a respective one of said plurality of said at least one peripheral device, passing said respective parameter data to said instance of said driver software for said respective one of said plurality of said at least one peripheral device.

34. The method of claim 31 wherein:

said configuration file comprises respective parameter data to be passed to respective driver software for each of a plurality of said at least one peripheral device; said method further comprising:

passing said parameter data to said driver software for each respective one of said plurality of said at least one peripheral device after loading said driver software and configuring instances of said driver software for all of said plurality of said at least one peripheral device.

35. The method of claim 25 wherein:

said configuration file comprises respective parameter data to be passed to respective driver software for each of a plurality of said at least one peripheral device; said method further comprising:

after loading said respective driver software and configuring an instance of said driver software for a respective one of said plurality of said at least one peripheral device, passing said respective parameter data to said instance of said driver software for said respective one of said plurality of said at least one peripheral device.

36. The method of claim 25 wherein:

said configuration file comprises respective parameter data to be passed to respective driver software for each of a plurality of said at least one peripheral device; said method further comprising:

passing said parameter data said driver software for each respective one of said plurality of said at least one peripheral device after loading said driver software and configuring instances of said driver software for all of said plurality of said at least one peripheral device.

* * * * *